April 14, 1964     M. J. LEBOW     3,128,622

TORQUE METER

Filed March 21, 1960

INVENTOR
MILTON J. LEBOW
ROBERT H. ELLIOTT
AGENT

United States Patent Office 3,128,622
Patented Apr. 14, 1964

3,128,622
TORQUE METER
Milton J. Lebow, Oak Park, Mich., assignor to
Lebow Associates Inc., Detroit, Mich.
Filed Mar. 21, 1960, Ser. No. 16,529
1 Claim. (Cl. 73—136)

The present invention relates to new and useful improvements in torquemeters and more particularly to a torquemeter which has high accuracy in the very low range.

It is therefore an object of the present invention to provide a torquemeter which is small in size and readily adaptable for attachment to the device being analyzed.

Yet another object of the present invention is the provision of a torquemeter which will be unaffected by temperature, vibration, humidity or other ambient conditions likely to be encountered in testing machine elements under service loads.

Another object of the present invention is the provision of a light weight torquemeter which is highly sensitive and accurate without being fragile.

Still another object of the instant invention is the provision of a torquemeter which is economically practical.

Another object of this invention is the provision of a torquemeter which can be used with any existing strain gage readout system.

The foregoing objects can be accomplished by the provision of a torquemeter having a bracket member; coaxial input and output shaft members; two concentric cylindrical sleeve members, the outer cylindrical member joined to said input shaft, the inner cylindrical member joined to said output shaft; four thin flexible web members disposed in spaced relationship intermediate said inner and outer concentric cylindrical members; two of said flexible web members in a first geometric plane disposed at 90° to each other; two of said flexible web members in a second geometric plane disposed at 90° to each other; said flexible webs in said first plane disposed 180° from the flexible webs in said second plane; bonded wire strain gages secured to each side of each of said flexible web members; slip rings and brushes connected to said strain gages and a connector means on said bracket member for connection of the complete assembly to a commercial readout system.

Other objects of this invention will appear in the following description and appended claims, reference being had to the accompanying drawings forming a part of this specification wherein like reference characters designate corresponding parts in the several views.

Figure 1:
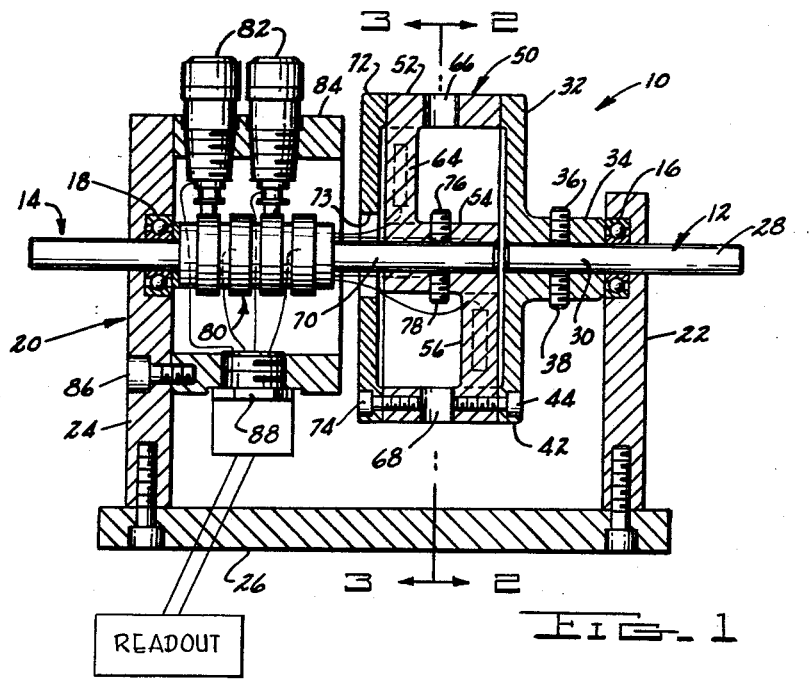
FIG. 1 is a cross sectional view of a torquemeter embodying the present invention.

The torquemeter assembly 10 illustrated in FIG. 1 of the drawings has a driving or input shaft 12 and a driven or output shaft 14 co-axial therewith. Both input and output shaft members 12 and 14 are rotatably journaled in bearings 16 and 18, positioned in the mounting stand 20. Bearing 16 is positioned in end member 22 of the mounting stand 20, while bearing 18 is positioned coaxially therewith in end member 24. Both end members 22 and 24 are vertically disposed and secured to a flat base member 26 which extends generally parallel to the rotational axis of the complete assembly.

Figure 2:
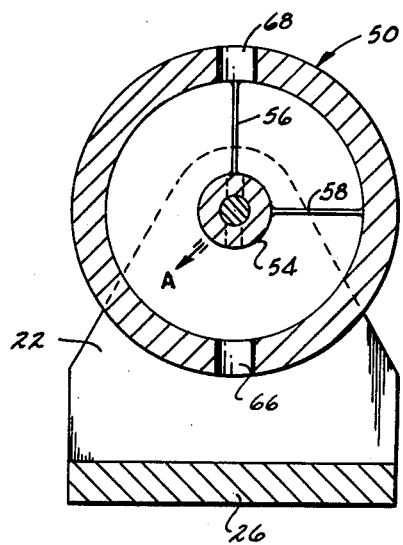
FIG. 2 is a cross sectional view taken substantially along lines 2—2 of FIG. 1 and rotated 180°.
Figure 3:
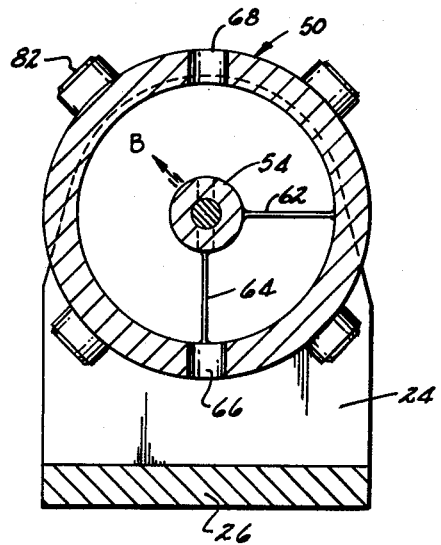
FIG. 3 is a cross sectional view taken substantially along lines 3—3 of FIG. 1 and rotated 180°.

The outer end 28 of input shaft 12 is adapted to be coupled to a test member while the inner end 30 has a circular disc member 32 integral with hub 34. The circular disc member 32 is rigidly secured to the inner end 30 of input shaft 12 with a pair of set screws 36 and 38 which are threaded into the hub 34 thereof. The periphery 42 of the circular disc member 32 is secured to a cylindrical sleeve member 50 with a plurality of screws 44 which extend in generally parallel relationship to the axis of rotation. The cylindrical sleeve member 50 is spaced from an inner cylindrical sleeve 54 at each end thereof, with a pair of thin, generally rectangular shaped web members. The first pair of web members 56 and 58 are displaced 90° from each other in a manner to maintain and support the right end of the inner sleeve 54 (FIGURE 2) substantially concentric with the right end of the outer sleeve 50. Web members 62 and 64 on the left end of the inner sleeve 54 are likewise displaced 90° from each other to maintain and support the left end of the outer sleeve 50 substantially concentric with the left end of the inner sleeve 54 (FIGURE 3). Each of the web members, although in different planes, is disposed diametrically opposite to its respective counterpart. Web 56 is disposed radially along the rotational axis opposite web 64 and web 58 is similarly disposed along the same rotational axis opposite web 62.

The axial opening provided in the inner cylindrical sleeve member 54 is adapted to receive the inner end 70 of the output shaft 14. End 70 of the output shaft 14 is secured in position by a pair of set screws 76 and 78 located on the inner sleeve 54 and perpendicular to said shaft. Adjustment of the set screws 76 and 78 when required is made through openings 66 and 68 in the outer sleeve member 52. The set screws 76 and 78 are of course secured after the disc member 72 on the left end of the sleeve member 50 is positioned with screws 74. Screws 74 are located in the periphery of the circular disc member 72 and in generally parallel relationship to the rotational axis of the assembly.

Output shaft 14 is journaled in a bearing 18 on one end and in the sleeve 54 on the other. Intermediate the ends thereof, a plurality of coin silver slip rings 80 are provided. Silver graphite brushes 82 are appropriately mounted on the circumference of a circular housing bracket member 84. The circular housing bracket member 84 is secured to the end member 24 of the mounting stand 20 with a plurality of screws 86. A connector member 88 is also positioned on the circular housing bracket member 84.

The thin web members 56, 58, 62, and 64 in the present device act as a coupling and are adapted to flex in accordance with the load applied thereto. Therefore, in order to determine the amount of torque load which has been applied, an electrical impedance measuring strain gauge device is applied to each of the thin webs, each of the impedance measuring means are suitably connected to the slip rings 80 in the conventional manner. The brush members 82 are connected to the connector 88 and the connector 88 in turn is connected to a commercial readout system. The strain gages and associated circuitry has been omitted because of its standard nature and may be accomplished in a number of different ways. A typical circuit is illustrated in part 2 of a book published by M. I. T. (Copyright 1956) tilted, "Strain Gage Techniques," the authors of which are, William Murray and Peter K. Stein. The illustration is found on page 401, chapter 15.

The most common type of strain impedance means is the bonded wire resistance strain gage and is well known in the art. The bonded wire strain gage is positioned on one side of each web member or one may be positioned on both sides of each web member when maximum sensitivity is required. The lead wires from each of the strain gages extend through the axial opening 73 in the disc member 72 and are suitably connected to the coil silver rings 80.

When the torquemeter of the present invention is used under adverse ambient temperatures, accurate output results are obtained. Any linear expansion of the thin, generally rectangular shaped web members 56 and 58 cause a resultant force in the direction of arrow A, while a similar expansion in webs 66 and 64 causes a resultant force in the direction of arrow B which forces although slight are in opposite directions and cancel themselves out with a minute cocking of the inner sleeve member 54 on shaft 14.

From the foregoing description, it will be apparent to one skilled in the art that I have provided a totally enclosed torquemeter which is small in size, durable in construction and useable with any existing commercial readout system with a high degree of accuracy in the very low ranges, which accuracy is not possible to obtain with instruments previously available.

It is to be understood that the invention is not limited in its application to details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having thus described my invention, I claim:

In a torque meter, the combination of, a mounting frame; co-axial input and output shaft members; two concentric, generally hollow cylindrical sleeve members positioned intermediate said input and output shaft members; a plurality of resilient members disposed intermediate said hollow cylindrical sleeve members, said resilient members located in two axially displaced geometric planes; at least one of said resilient members in a first plane and at least one of said resilient members in a second plane and displaced along a common axis, said resilient members displaced 180° from each other, said resilient members coupling said hollow cylindrical sleeve members together; a disc member connecting said input shaft and said outer sleeve, the output shaft positioned in said inner sleeve, thereby forming a rotatable unit assembly; resistance wire strain gages bonded to each of said resilient members; and means for reading and recording the resistance change in said strain gages when said resilient members are flexed.

References Cited in the file of this patent
UNITED STATES PATENTS

| | | |
|---|---|---|
| 2,403,952 | Ruge | July 16, 1946 |
| 2,795,131 | Booth | June 11, 1957 |
| 2,811,853 | Friedman | Nov. 5, 1957 |
| 2,915,896 | Booth et al. | Dec. 8, 1959 |
| 2,955,454 | Husher | Oct. 11, 1960 |